United States Patent [19]

Koma et al.

[11] Patent Number: 5,309,500
[45] Date of Patent: May 3, 1994

[54] APPARATUS FOR DISPLAYING TIME-OF-DAY DATA ADAPTIVELY TO DIFFERENT TIME ZONES

[75] Inventors: Noriko Koma, Tokyo; Kazuaki Iguchi, Saitama, both of Japan

[73] Assignee: NEC Corporation, Tokyo, Japan

[21] Appl. No.: 80,516

[22] Filed: Jun. 24, 1993

Related U.S. Application Data

[62] Division of Ser. No. 756,656, Sep. 9, 1991, Pat. No. 5,258,964.

[30] Foreign Application Priority Data

Sep. 7, 1990 [JP] Japan .................. 2-238480

[51] Int. Cl.⁵ .................. H04M 11/00; G04C 11/02; H04B 15/00
[52] U.S. Cl. .......................... 379/58; 368/47; 455/58.2
[58] Field of Search ............... 340/539; 342/457, 463; 368/47; 379/56, 57, 58, 59, 131, 433; 455/33.1, 58.2

[56] References Cited

U.S. PATENT DOCUMENTS

| | | | |
|---|---|---|---|
| 4,204,398 | 5/1980 | Lemelson | 368/47 |
| 5,065,423 | 11/1991 | Gaskill | 379/57 |
| 5,212,810 | 5/1993 | Maeda et al. | 455/58.2 |
| 5,222,127 | 6/1993 | Fukui | 379/131 |

FOREIGN PATENT DOCUMENTS

| | | | |
|---|---|---|---|
| 60-056286 | 4/1985 | Japan . | |
| 4-056530 | 2/1992 | Japan | 379/58 |

*Primary Examiner*—Curtis Kuntz
*Assistant Examiner*—William Cumming
*Attorney, Agent, or Firm*—Sughrue, Mion, Zinn, Macpeak & Seas

[57] ABSTRACT

A cellular mobile station is operable in a telephone mode and a time data display mode. During the time display mode, the station constantly receives an area identifying code transmitted from a cellular mobile communications system. On crossing a boundary between adjoining cell-site areas, a time difference value is entered from a keypad into a location of a memory corresponding to the received code. This process is continued on a learning basis to store as many time difference values into the memory as there are cell-site areas along the route of a journey. Following the learning process, the station constantly receives an area identifying code and recalls one of the stored time difference data from the memory corresponding to a code received on crossing a boundary and modifies displayed timepiece data with the recalled time difference.

4 Claims, 3 Drawing Sheets

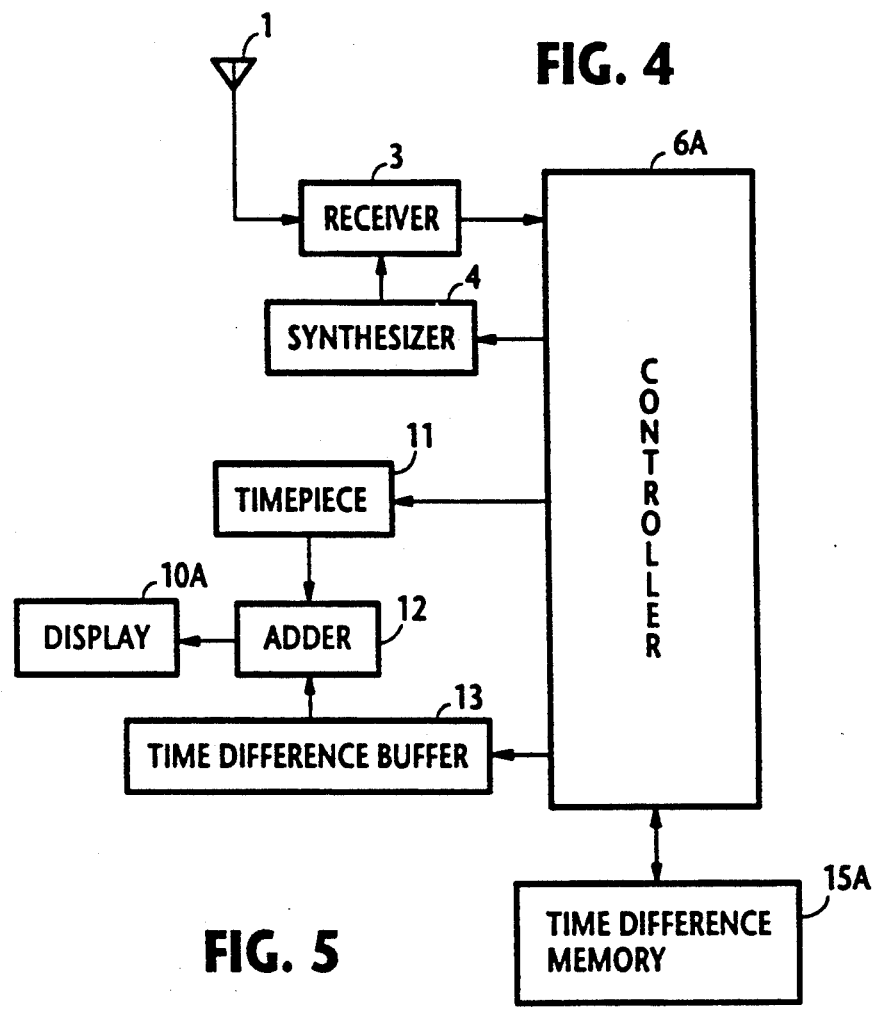
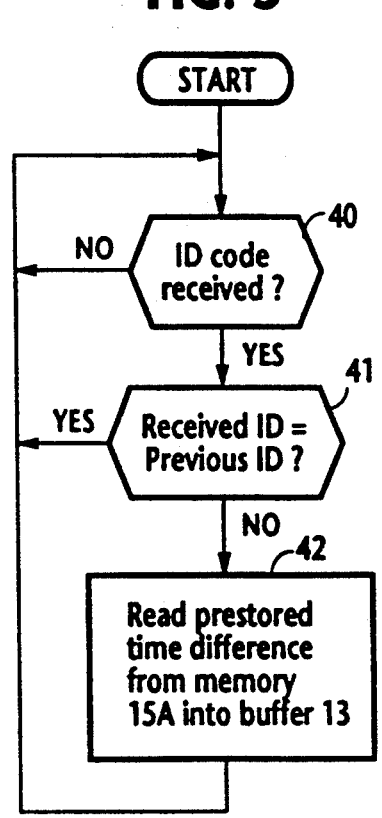

APPARATUS FOR DISPLAYING TIME-OF-DAY DATA ADAPTIVELY TO DIFFERENT TIME ZONES

This is a divisional of application Ser. No. 07/756,656 filed Sep. 9, 1991 now U.S. Pat. No. 5,258,964.

BACKGROUND OF THE INVENTION

The present invention relates to a time-keeping apparatus.

When travelling in a continental area having different time zones, travellers have to adjust their wrist watches to the local time on crossing a boundary between adjoining time zones. This represents an undesirable situation when the travellers are driving an automobile.

SUMMARY OF THE INVENTION

It is therefore an object of the present invention to provide a time-keeping apparatus capable of adaptively updating a time-of-day display with stored time differences with respect to a user's reference location.

The present invention utilizes area identifying codes transmitted from a cellular mobile communications system as an indication of the location of travel for updating timepiece data.

According to one aspect of this invention, there is provided a time-keeping apparatus which comprises a timepiece for constantly generating time-of-day data. A receiver is provided for receiving area identifying codes transmitted from a cellular mobile communications system. A plurality of time difference data are prestored in locations of a memory which are accessible as a function of a received area identifying code. On crossing a boundary between adjoining cell-site areas, one of the prestored time difference data is recalled from the memory corresponding to a received area identifying code and the time-of-day data is modified with the recalled time difference data and put on display on a display unit.

According to another aspect of this invention, the time difference data are successively stored into the memory on a learning basis as the user travels along a route. The apparatus includes a keypad for manually entering time difference data and time difference data are successively entered through the keypad and stored into the memory corresponding to successively received area identifying codes.

The apparatus is advantageously incorporated in a cellular mobile telephone set by sharing its receiver and control functions.

BRIEF DESCRIPTION OF THE DRAWINGS

The present invention will be described in further detail with reference to the accompanying drawings, in which:

FIG. 4 is a block diagram of a time-keeping apparatus of the invention; and

FIG. 5 is a flowchart of programmed instructions of the controller of FIG. 4.

DETAILED DESCRIPTION

Figures 1, 2:
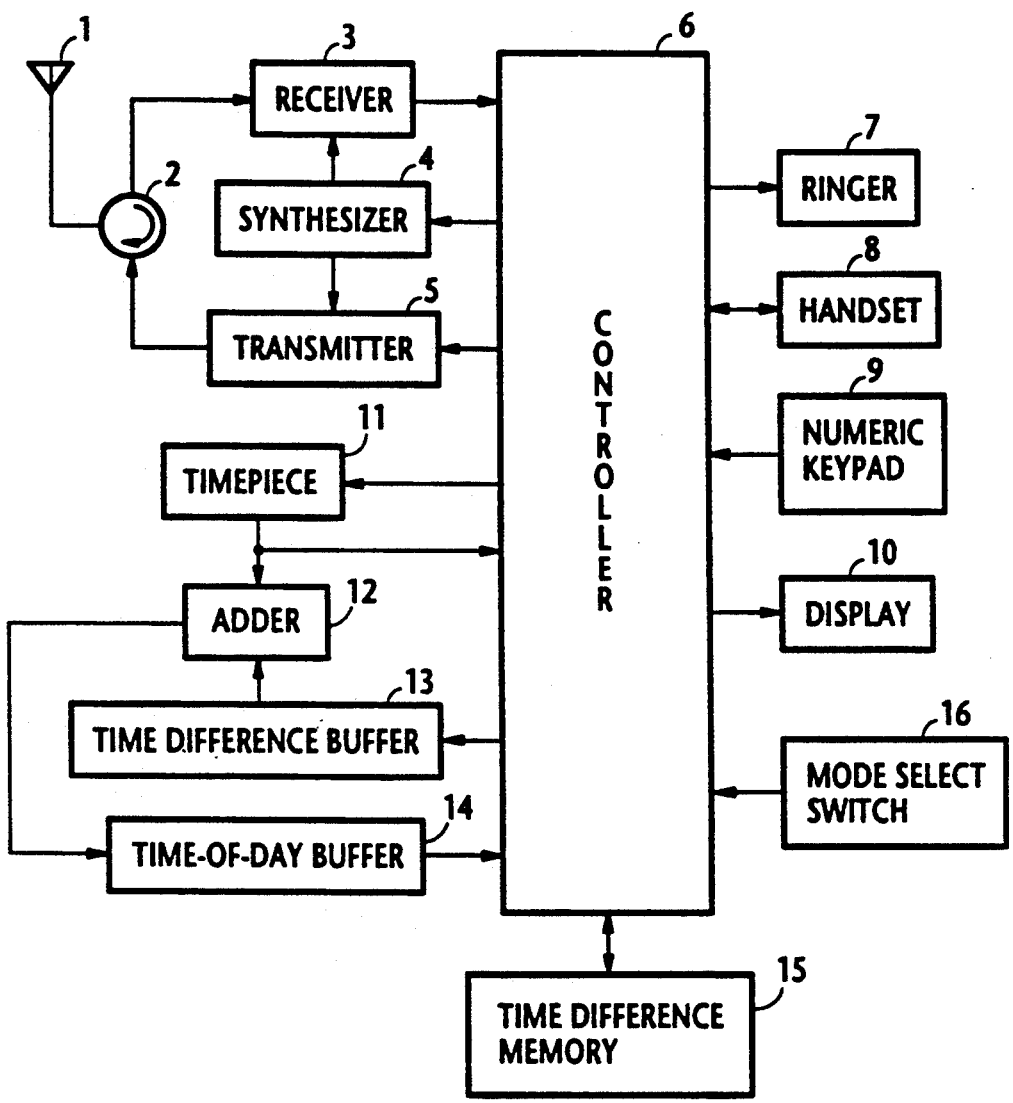
FIG. 1 is a block diagram of a mobile station incorporating the adaptive time-keeping apparatus of this invention.
FIG. 2 is a view showing details of the memory of FIG. 1.

Referring now to FIG. 1, there is shown an adaptive time-keeping apparatus according to the present invention. The function of the time-keeping apparatus is shown as incorporated in a hand-held portable telephone or a mobile unit installed in an automotive vehicle, and includes an antenna 1 for receiving incoming signals from and transmitting outgoing signals to a nearby site of a cellular mobile communications systems. The telephone receives area identifying code signals from cell sides as it is moved from one cell to another. The area identifying code is transmitted in a specified control field of an overhead message which is used in cellular mobile communications. For example, in the cellular system designed to the EIA (Electrical Industries Association) standards, 14 bits are assigned in the control field of the overhead message to identify a cell site and its serving area.

The incoming signal is passed through diplexer 2 to a receiver 3 in which it is demodulated with a local carrier from a frequency synthesizer 4 and applied to a controller 6 in which it is decoded. A mode select switch 16 is provided for supplying a signal to controller 6 to indicate that the apparatus is in a telephone mode or a time display mode. During telephone modes, ringing signal is applied from controller 6 to a tone ringer 7 for alerting the user and speech signals are supplied to a handset 8. Dialing signal from a numeric keypad 9 and speech signal from handset 8 are decoded by controller 6 and modulated by a transmitter 5 onto a carrier from synthesizer 4 and transmitted through diplexer 2 from antenna 1. The called telephone number may be displayed on a liquid crystal display unit 10.

A timepiece 11, an adder 12, a time difference buffer 13, a time-of-day buffer 14 and a time difference memory 15 are connected to controller 6. Timepiece 11 is an electronic clock that counts clock pulses from a timebase, not shown, and constantly generates time-of-day data. The output of timepiece 11 is supplied to controller 6 as well as to one input of adder 12 and the output of time difference buffer 13 is applied to the other input of adder 12. Adder 12 provides a sum of these input time data to time-of-day buffer 14, whose output is coupled to controller 6. During time display mode, keypad 9 is used to enter time data into controller 6, and display unit 10 is coupled to the output of buffer 14 to provide display of its time-of-day data in a manner as will be described later.

As shown in FIG. 2, memory 15 is partitioned into first-column locations 17 for storing various area identifying codes and second-column locations 18 corresponding to locations 17 for storing time difference data. These data are stored in a learning process which will be described later.

Figure 3:
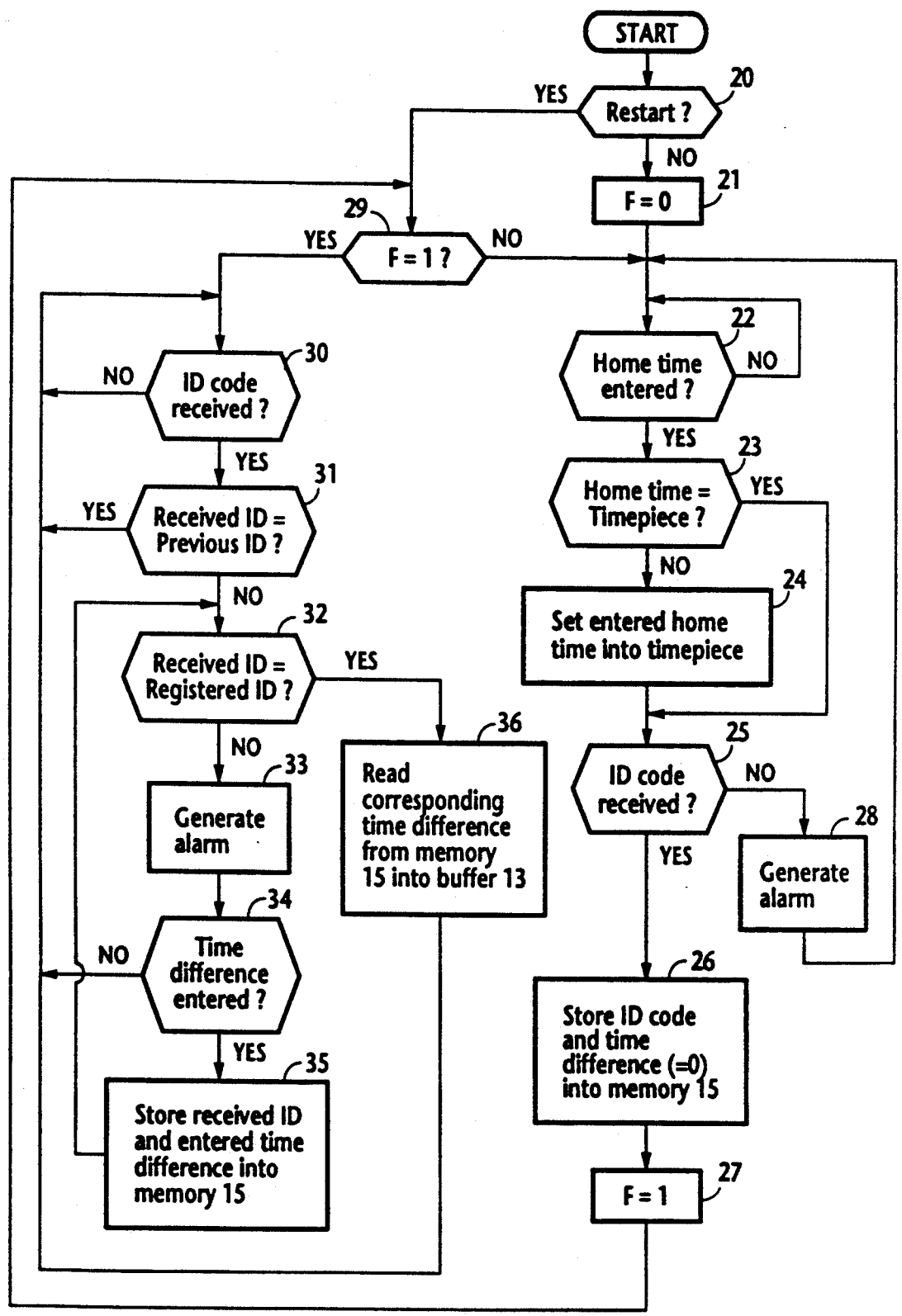
FIG. 3 is a flowchart of instructions programmed in the controller of FIG. 1 for operating the mobile station during a time display mode.

Controller 6 is programmed as shown in FIG. 3 to perform time-keeping operations. During a time display mode, the program starts with decision step 20 which checks to see if the program execution is initial startup or restart. If the execution is initial startup, control branches to initialization step 21 in which home-time registration flag F is set equal to 0. Exit then is to decision step 22 to check to see if "home time" is entered through keypad 9. In this specification, the term "home time" represents the time of day of the home position of the apparatus, or residential place of the owner of the apparatus. If no data is entered from keypad 9, control loops step 22. If home time data is entered, the program branches at step 22 to step 23 to check to see if the entered home time is equal to data indicated by timepiece 11. If the answer is negative, control exits to step 24 to set the entered home time data into timepiece 11 to make an initial adjustment of the timepiece, and goes to decision step 25. If the entered home time is equal to the timepiece data, control branches to step 25.

At step 25, control checks to see if the identifying code of the cell site of the owner's home area is received. If this is the case, control branches to step 26 to store the received identifying code and zero time difference data into locations 17 and 18 of memory 15, respectively, since the home area is always taken as a starting point of a journey and the time difference of a locality is measured with respect to it. Exit then is to step 27 to set flag F to 1, indicating that home time registration is complete, and control jumps to step 29.

If the area identifying code is not received within a specified period of time, the program branches at step 25 to step 28 to generate alarm sound from tone ringer 7 to indicate that home time registration is unsuccessful, and control returns to step 22 to repeat the process.

If the apparatus is restarted regardless of whether the home time data has been registered or not, the program branches at step 20 to step 29 to check to see if flag F is set equal to 1. With the home time registration being complete, the restarting of the apparatus causes control to branch at step 29 to step 30, entering an updating mode in which the contents of time-of-day buffer 14 are updated with time differences which may be successively encountered as the mobile station is travelled along the route of a trip.

Step 30 is looped to check for reception of an area identifying code. At step 31, a most recently received code is compared with a code previously received along the route of travel. If there is a match, control returns to step 30 to repeat the process. If the mobile station has crossed a boundary between adjacent cell-site areas, the most recently received code differs from the previous one and the program branches at step 31 to step 32 to make a search through the memory 15 to compare the most recent code with each stored code to detect a match therebetween.

If there is no match between corresponding area identifying codes, control branches at step 32 to a learning process which begins with step 33. At step 33, alarm sound is generated to urge the user to enter time difference data. The difference between the time of day of the user's home area and the time of day of the local area in which the mobile station is now located is manually entered through keypad 9 into controller 6.

Control exits to step 34 to check to see if time difference data has been entered. If so, control branches at step 34 to step 35; otherwise, it returns to step 30 repeat the process.

At step 35, the most recently received code and the time difference now entered through keypad 9 are stored into respective locations of memory 15, thus completing a learning process and allowing control to return to step 32. With the most recent code been stored into memory 15, the answer is positive at step 32 and control branches to step 36 to read out the time difference just stored in memory 15 using the most recent code as an address pointer and stores the recalled data into the time difference buffer 13. Thus, the time difference data is summed with the current timepiece data by adder 12 to supply time-of-day data that represents the time of day of the local area to the time-of-day buffer 14. Control now returns to step 30 to repeat the process.

By repeating the learning process as the mobile station continues along the travelling route, time difference data may be accumulated in memory 15 until it arrives at a destination, while step 36 is repeated to adaptively change the displayed time of day with the successively varying time differences.

Along the return journey, area identifying codes are successively received and checked against each of the codes stored in memory 15 (step 32) and the corresponding time difference data is read out of the memory into buffer 13 (step 326) so that its contents are automatically updated and the time of day of the successive local areas of the return route is displayed and the time difference is successively reduced as the home area is being approached. When the mobile station has returned to the home area, the home area code is received (step 30) and control branches at step 31 to step 32 to check it against the code stored in memory 15 during the home registration routine described above. Since there is a match, the program branches at step 32 to step 36 to read a zero time difference out of memory 15 into buffer 13 so that the time difference is finally reduced to zero.

The time-keeping part of the apparatus can be made compact by separating it from the telephone part of the apparatus as it needs no signal transmission. As shown in FIG. 4, diplexer 2, transmitter 6, ringer 7, and handset 8 are eliminated for exclusive reception of area identifying codes for adaptively updating the time of day data. In this embodiment, the keypad 9 of FIG. 1 is also dispensed with, and display unit 10A is directly connected to the output of adder 12. A simplified version of control circuitry can be employed for controller 6A. In addition, the program of controller 6A can be further simplified as shown in FIG. 5 by providing a memory 15A in which time differences are prestored by the supplier, eliminating the learning process for relieving the user's burden. In FIG. 5, the program starts with decision step 40 to check for the reception of an area identifying code and on receiving it, control branches to step 41 to check it with a previous code. If a mismatch occurs, control branches to step 42 to read out a corresponding time difference data from memory 15 into buffer 13 to update the time-of-day data indicated by display unit 10A.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

We claim:

1. A cellular mobile telephone set operable in a telephone mode and a time data display mode, said telephone set including a receiver for receiving area identifying codes transmitted from a cellular mobile communications system and a keypad, comprising:

a timepiece for constantly generating time-of-day data;

a memory;

write control means responsive to said receiver during said time data display mode for storing a plurality of successive time difference data entered from said keypad into said memory respectively corresponding to area identifying codes successively received by said receiver;

read control means responsive to said receiver during said time data display mode for recalling one of the stored time difference data from said memory corresponding to an area identifying code received by said receiver and modifying said time-of-day data with the recalled time difference data; and a display for displaying the modified time-of-day data.

2. A cellular mobile telephone set as claimed in claim 1, wherein said read control means comprises means for comparing an area identifying code most recently received by said receiver with a previously received area identifying code and recalling said time difference data from said memory when said compared codes differ from each other.

3. A cellular mobile telephone set as claimed in claim 1, wherein each of the stored time difference data is indicative of a time difference of a local area with respect to a user's home area.

4. A cellular mobile telephone set as claimed in claim 1, wherein said read control means comprises buffer means for storing time difference data recalled from said memory and adder means for combining data stored in said buffer means with the time-of-day data from said timepiece, said display unit displaying the combined data.

* * * * *